Sept. 11, 1951 W. STATKUS 2,567,303
PIPE HANDLING APPARATUS FOR WELDING
Filed Aug. 1, 1949 2 Sheets-Sheet 1
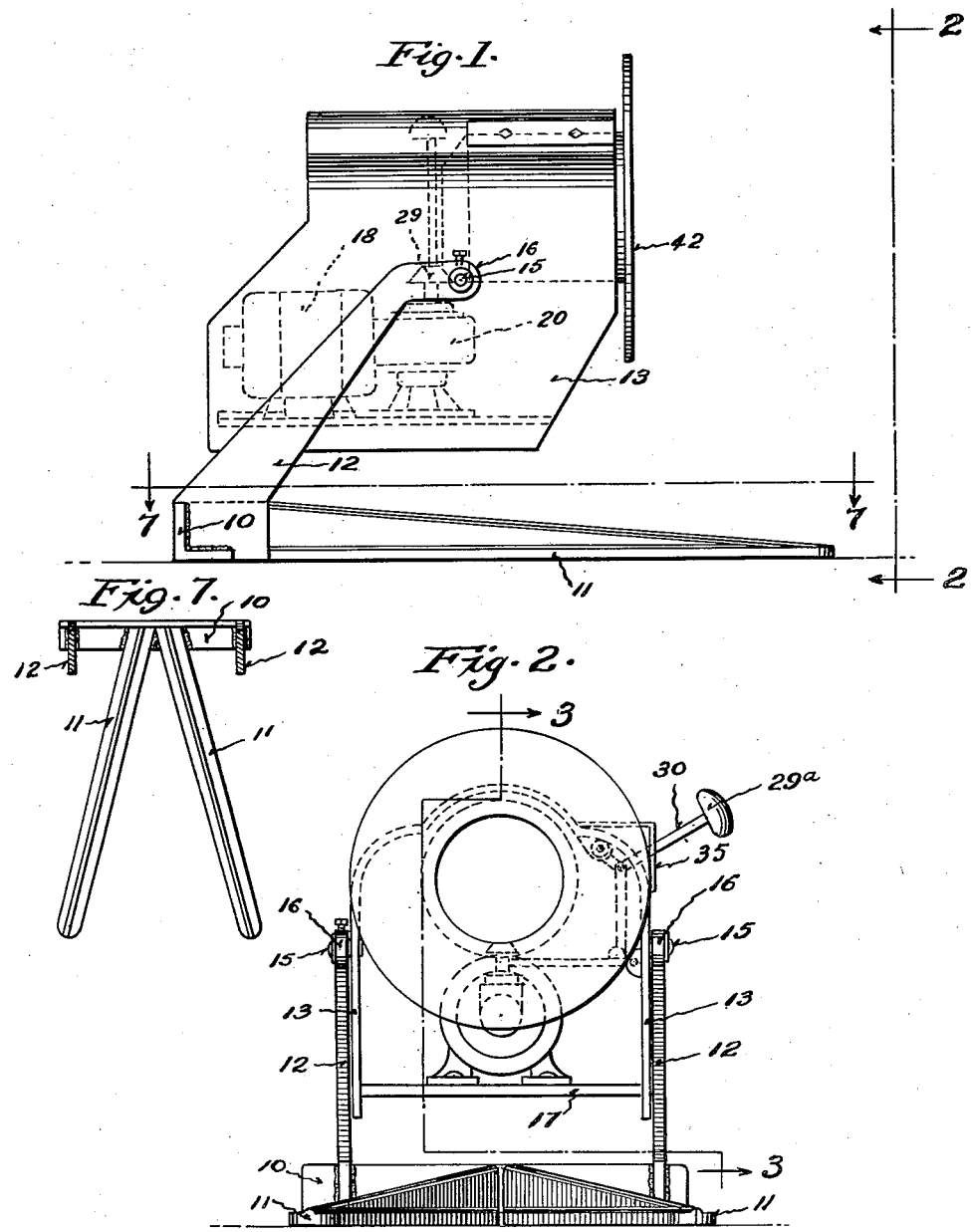
INVENTOR.
Walter Statkus
BY Gerald P Welch
ATTORNEY

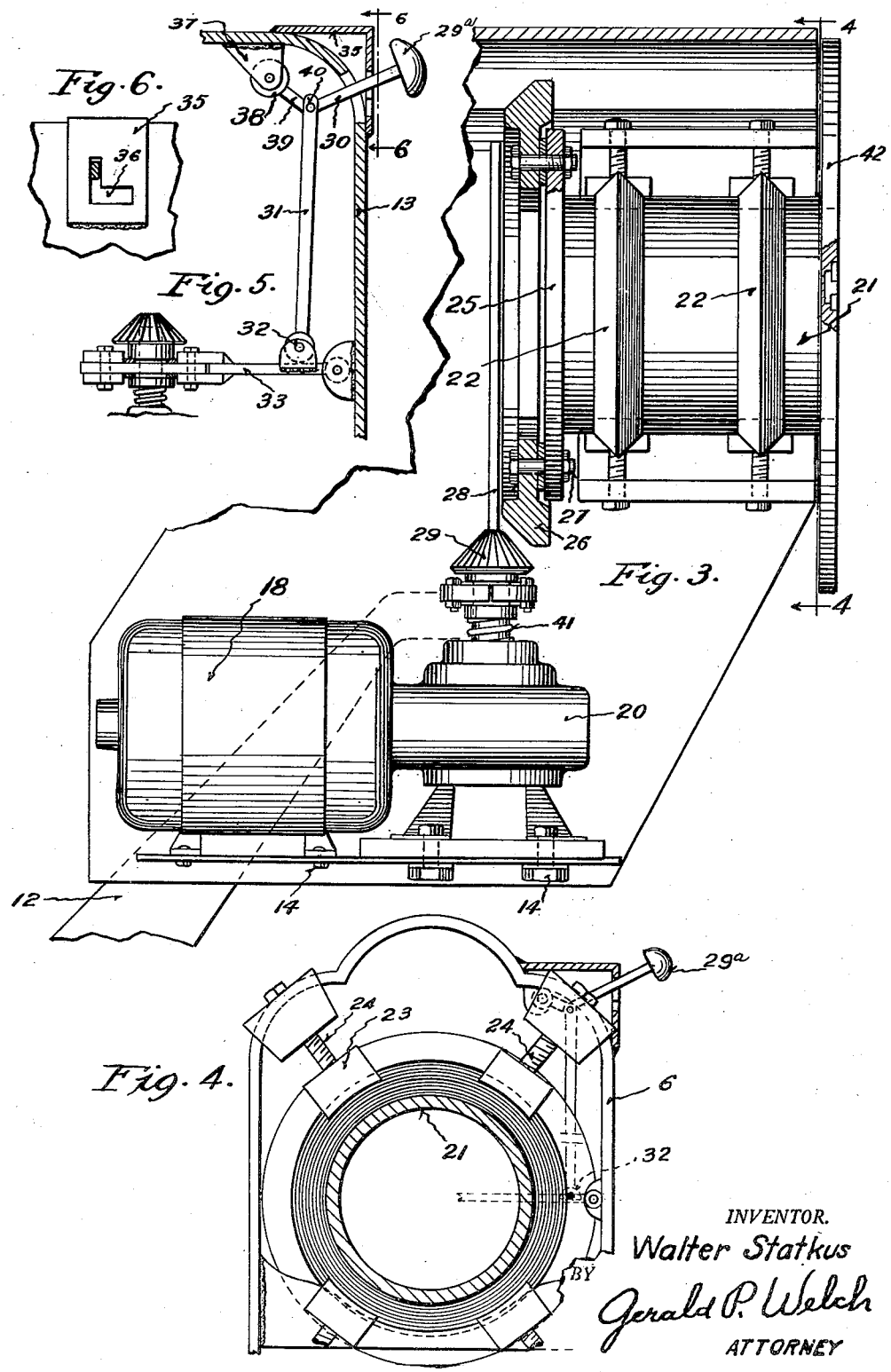

Patented Sept. 11, 1951

2,567,303

UNITED STATES PATENT OFFICE 2,567,303

PIPE HANDLING APPARATUS FOR WELDING

Walter Statkus, Milwaukee, Wis.

Application August 1, 1949, Serial No. 107,998

2 Claims. (Cl. 113—102)

This invention relates to improvements in pipe handling apparatus for welding, and more particularly to a novel rotatable pipe handling apparatus for welding.

An object of the invention is to provide a device of the type which will provide means for retaining and rotating a circular element such as pipe during the welding process.

Another object of the invention is to provide an apparatus of the type which will include means for starting and stopping the rotation of a pipe during the welding process.

Other and further objects of the invention will appear as the description proceeds, reference being had to the accompanying drawings, in which:

Fig. 1 is a side view in elevation of a pipe handling apparatus for welding embodying the invention.

Fig. 2 is a view on line 2—2 of Fig. 1.

Fig. 3 is view on line 3—3 of Fig. 2.

Fig. 4 is a view on line 4—4 of Fig. 3.

Fig. 5 is a vertical sectional view of the clutch apparatus.

Fig. 6 is a view on line 6—6 of Fig. 5.

Fig. 7 is a view on line 7—7 of Fig. 1.

Referring more particularly to the drawings, the numeral 10 refers to an angle base, having the angularly extended portions 11 affixed thereto, and the upwardly obliquely disposed trunnion arm 12. A casing 13 is provided with the trunnion bolts 15, which pivot in the upper end 16 of the trunnion arms 12. A platform 17 in the casing 13 has secured thereto by bolt means 14, an electrical motor 18 and a reduction gear assembly 19. A cylinder 21 carries the spaced angular ribs 22 which run in the guide blocks 23, which latter are adjustable on the threaded means 24. The cylinder 21 is provided with the circular end plates 25 on which a ring gear 26 is secured by a plurality of bolts 27. The reduction gear 20 has an upwardly extending shaft 28 slideably mounting the pinion gear 29, and which may be raised to mesh with the ring gear 26 by means of the handle member 29a, the arm 30, and the link 31 pivotally engaged at 32 with the pinion elevated means 33. The arm 30 extends through an aperture at 34 in the casing 13 and through an angular plate 35 fixed exteriorly of said casing, provided with an angular slot at 36 thereof. A bracket 37 subjoined interiorly of the top of casing 13 has pivotally connected thereto a circular element 38 to which is affixed a link 39 pivotally connected at 40 with the arm 30 and the link 31. A coil spring 41 normally maintains the pinion 29 in an upward position in mesh with the ring gear 26.

In operation, a pipe or other cylindrical object to be welded may be inserted within the cylinder 21 so that the portion to be welded will protrude outwardly beyond the turntable plate 42. The object to be welded may be secured within the cylinder 21 by wedging or other means and the adjustment of the threaded means 24 will provide for true turning of the article held within said cylinder. If it is necessary during the welding operation to stop the rotation of cylinder 21, this may be effected by pushing in on the handle 29a and fixing the same upwardly within the angular slot at 36. A return of the handle 29a will mesh the pinion 29 with the ring gear 26 to resume rotation of cylinder 21 and the work held therein.

It will be understood that the device is capable of many modifications in structure and design, without departing from the spirit of the invention, within the scope of the appended claims.

Having thus described the invention, what is claimed and desired to be secured by Letters Patent of the United States, is:

1. A pipe handling apparatus for welding including a casing mounted for movement about a horizontal axis, a cylinder for retaining an object to be welded mounted in said casing for rotation at right angles to the axis of said casing mounting, a plurality of ribs circumferentially disposed on said cylinder, riding blocks for the ribs held in said casing, means for adjusting the blocks to adjust the position of the axis of rotation of an object held in said cylinder, and a motor to turn the latter.

2. A pipe handling apparatus for welding including a casing mounted for movement about a horizontal axis, a cylinder for retaining an object to be welded mounted in said casing for rotation about an axis at right angles to the axis of said casing mounting, a plurality of ribs circumferentially disposed on said cylinder, a plurality of riding blocks for the ribs held in said casing, threaded means for adjusting the blocks to adjust the position of the axis of rotation of an object to be welded held in said cylinder, an electrical motor held in said cylinder, a gear reduction unit connected to said motor, a ring gear on the cylinder, a movable gear operable by said gear reduction unit, and means for bringing the movable gear into mesh with said ring gear to rotate said cylinder.

WALTER STATKUS.

REFERENCES CITED

The following references are of record in the file of this patent:

UNITED STATES PATENTS

| Number | Name | Date |
|---|---|---|
| 130,373 | Howe | Aug. 13, 1872 |
| 1,130,233 | Wood | Mar. 2, 1915 |
| 1,751,510 | Cunningham | Mar. 25, 1930 |
| 2,445,016 | Bentley | July 13, 1948 |
| 2,459,228 | Konicek et al. | Jan. 18, 1949 |